(12) United States Patent
Schibsbye

(10) Patent No.: US 11,073,129 B2
(45) Date of Patent: Jul. 27, 2021

(54) WIND TURBINE BLADE WITH IMPROVED GLUE JOINTS AND RELATED METHOD

(71) Applicant: LM Wind Power US Technology ApS, Kolding (DK)

(72) Inventor: Karsten Schibsbye, Fredericia (DK)

(73) Assignee: LM WIND POWER US TECHNOLOGY APS, Kolding (DK)

(*) Notice: Subject to any disclaimer, the term of this patent is extended or adjusted under 35 U.S.C. 154(b) by 68 days.

(21) Appl. No.: 16/311,487

(22) PCT Filed: Jun. 20, 2017

(86) PCT No.: PCT/EP2017/065116
§ 371 (c)(1),
(2) Date: Dec. 19, 2018

(87) PCT Pub. No.: WO2017/220596
PCT Pub. Date: Dec. 28, 2017

(65) Prior Publication Data
US 2019/0232571 A1    Aug. 1, 2019

(30) Foreign Application Priority Data
Jun. 22, 2016 (EP) ...................... 16175793

(51) Int. Cl.
*B32B 37/12* (2006.01)
*F03D 1/06* (2006.01)
(Continued)

(52) U.S. Cl.
CPC .......... *F03D 1/0675* (2013.01); *B29C 65/483* (2013.01); *B29C 65/70* (2013.01);
(Continued)

(58) Field of Classification Search
CPC ............... B29C 66/1122; B29C 66/112; B29C 66/1312; B29C 66/541; B29C 66/721;
(Continued)

(56) References Cited

U.S. PATENT DOCUMENTS

2014/0301859 A1* 10/2014 Hancock ............... B29C 70/865
416/230
2015/0137419 A1* 5/2015 Ullmann .................... C09J 5/00
264/261
(Continued)

FOREIGN PATENT DOCUMENTS

| GB | 2529186 A | 2/2016 |
|---|---|---|
| GB | 2529439 A | 2/2016 |

OTHER PUBLICATIONS

Indian First Examination Report dated Jan. 26, 2021 corresponding to application No. 201947002519.

*Primary Examiner* — Vishal I Patel
(74) *Attorney, Agent, or Firm* — Nath, Goldberg & Meyer; Jerald L. Meyer; Tanya E. Harkins

(57) ABSTRACT

The disclosure presents a wind turbine blade and a method of manufacturing a wind turbine blade, wherein the wind turbine blade is manufactured as a composite structure comprising a reinforcement material embedded in a polymer matrix, the method comprising: providing a first blade mould with a first blade shell part having a leading edge, a trailing edge, and a first leading edge glue surface at the leading edge, the first blade mould comprising a first leading edge flange; providing a second blade mould with a second blade shell part having a leading edge, a trailing edge, and a second leading edge glue surface at the leading edge, the second blade mould comprising a second leading edge flange; applying glue to a leading edge glue surface; providing one or more leading edge spacer elements at a leading edge flange; arranging the second blade mould on the first
(Continued)

Figure 1:
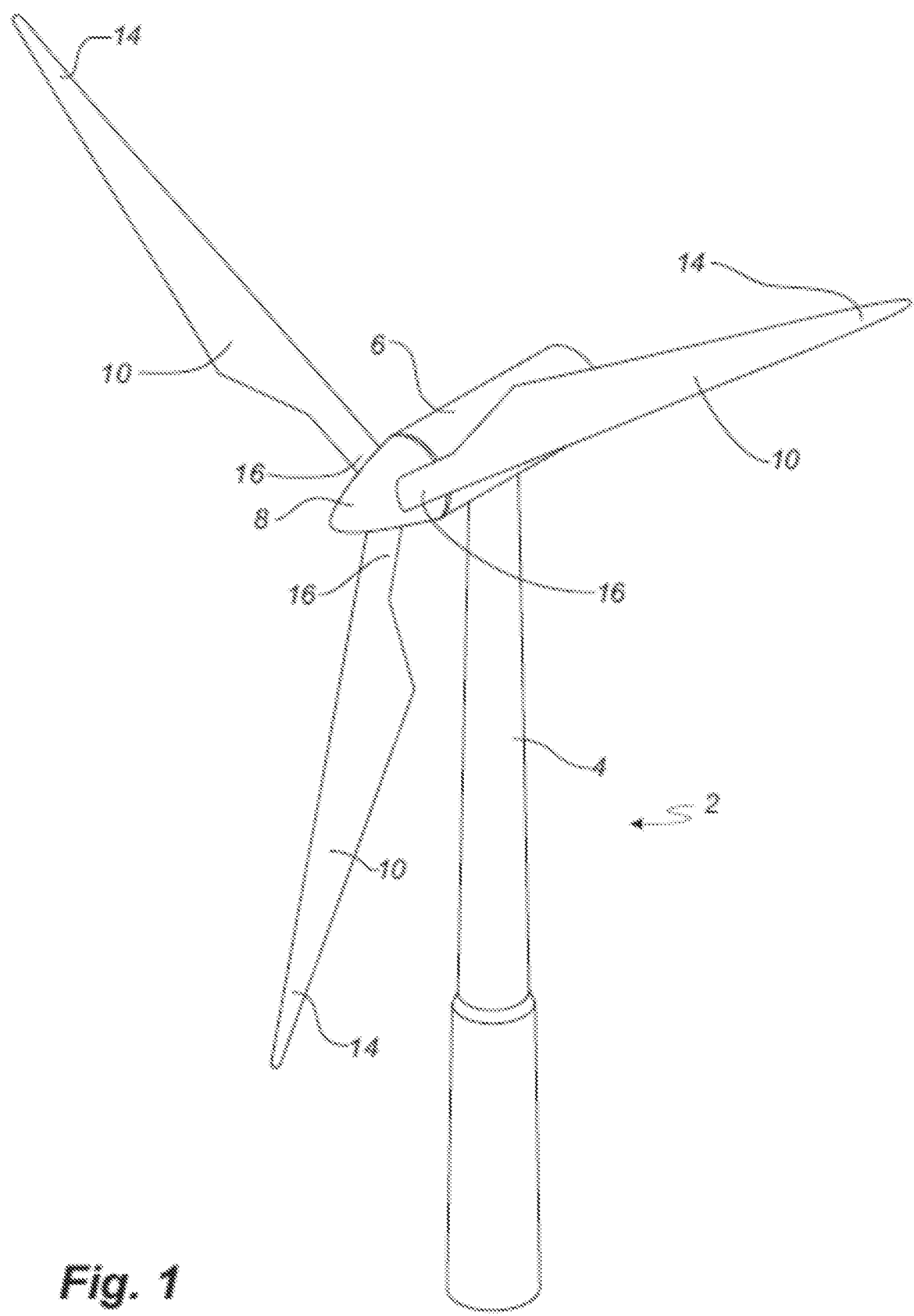

blade mould, such that the one or more leading edge spacer elements are arranged between the first leading edge flange and the second leading edge flange; applying a pressure to the second blade shell part; and curing the glue.

10 Claims, 5 Drawing Sheets

(51) Int. Cl.
    *B29C 65/48*     (2006.01)
    *B29C 65/00*     (2006.01)
    *B29D 99/00*     (2010.01)
    *B29C 65/78*     (2006.01)
    *B29C 65/70*     (2006.01)
    *B29L 31/08*     (2006.01)
    *B29C 33/30*     (2006.01)

(52) U.S. Cl.
    CPC ........ *B29C 65/7826* (2013.01); *B29C 66/112* (2013.01); *B29C 66/1122* (2013.01); *B29C 66/1222* (2013.01); *B29C 66/1228* (2013.01); *B29C 66/131* (2013.01); *B29C 66/1312* (2013.01); *B29C 66/54* (2013.01); *B29C 66/541* (2013.01); *B29C 66/721* (2013.01); *B29C 66/8322* (2013.01); *B29D 99/0028* (2013.01); *B29C 33/30* (2013.01); *B29C 66/7212* (2013.01); *B29L 2031/085* (2013.01); *F05B 2230/20* (2013.01); *F05B 2240/2212* (2013.01); *F05B 2240/301* (2013.01); *Y02E 10/72* (2013.01); *Y02P 70/50* (2015.11)

(58) Field of Classification Search
CPC . B29C 33/30; B29C 66/1228; B29C 66/1222; B29C 66/131; B29C 66/8322; B29C 65/483; B29C 66/81431; B29C 65/7826; B29C 66/7212; B29C 66/3242; B29C 65/70; B29C 66/54; B29C 66/636; F03D 1/0675; Y02E 10/72; B29L 2031/085; F05B 2240/2212; F05B 2240/301; F05B 2230/20; B29D 99/0028; Y02P 70/50; B29K 2309/08; B29K 2307/04
See application file for complete search history.

(56) References Cited

U.S. PATENT DOCUMENTS

| | | | |
|---|---|---|---|
| 2015/0152838 A1* | 6/2015 | Merzhaeuser | F03D 1/0675 416/226 |
| 2018/0216602 A1* | 8/2018 | Bech | F03D 1/0675 |
| 2019/0210296 A1* | 7/2019 | Lehmann Madsen | B29C 66/54 |

* cited by examiner

WIND TURBINE BLADE WITH IMPROVED GLUE JOINTS AND RELATED METHOD

This is a National Phase Application filed under 35 U.S.C. 371 as a national stage of PCT/EP2017/065116, filed Jun. 20, 2017, an application claiming the benefit of European Application No. 16175793.5, filed Jun. 22, 2016, the content of each of which is hereby incorporated by reference in its entirety.

TECHNICAL FIELD

The present disclosure pertains to the field of manufacturing wind turbine blades. In particular, the present disclosure relates to a wind turbine blade and manufacturing a wind turbine blade, wherein the wind turbine blade is manufactured as a composite structure comprising a reinforcement material embedded in a polymer matrix.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other reinforcement material, such as carbon fibre, in each of the two mould parts. Then, the two halves are glued together, often by means of internal flange parts. Glue is applied to the inner face of the lower or first blade shell half before the upper or second blade shell half is lowered thereon. Additionally, one or two reinforcing profiles (webs or beams) are often attached to the inside of the lower blade half prior to gluing to the upper blade half. The glue joints, also denoted adhesive joints, are known to represent a weak link in the structural integrity of wind turbine blades.

Wind turbine blades and therefore also the blade mould for moulding blade shell parts have become increasingly longer of the years and blades having a length of more than 70 metres are now commercially available on the market. Due to the large size, it has become increasingly complicated to manufacture wind turbine blades without errors, which can be detrimental to the mechanical strength of the wind turbine blade and may necessitate that the manufactured wind turbine blade has to scrapped or post-processed to a large extent.

GB 2 529 439 A discloses bonding of a first part of a wind turbine blade to a second part of a wind turbine blade, where the first part has a first mounting surface and the second part has a second mounting surface and one or more apertures. The disclosed method comprises providing locating devices shafts extending from the first mounting surface; arranging the first and second parts opposite each other; inserting an end of the locating device shaft through an aperture in the second mounting surface; providing adhesive between the first and second mounting surfaces; using the locating devices to apply a clamping force between the first and second parts to move them closer together to squeeze the adhesive between them; and providing stop elements between the first and second mounting surfaces to maintain a minimum separation to set a bond height.

GB 2 529 186 A discloses a method of bonding a shear web to a wind turbine blade shell. The method involves providing a seal on a mounting flange of the shear web such that when the mounting flange is positioned against the blade shell, a cavity is defined by the seal between the mounting flange and the blade shell. The cavity is then evacuated by vacuum and adhesive is injected into the cavity.

WO 2011/000381 A2 discloses a method of manufacturing a wind turbine blade having a first member with a first joining surface and a second member with a second joining surface. The method comprises applying at least one resin barrier to one or both of the joining surfaces, and subsequently locating the first and the second members adjacent each other so that they are joined by the at least one resin barrier. Hereby at least one cavity is formed between the first and second joining surfaces. Subsequently resin is filled into the at least one cavity, and the resin is cured.

EP 2 527 128 A2 discloses a method for bonding a first and a second prefabricated parts of a wind turbine blade comprising the steps of: disposing bands of an adhesive material in a manageable uncured state following traces signalled on a bonding area of one of said parts, the width and height of said bands and the separation between said traces is determined such that a predetermined separation between said bands comprised between 0-300 mm remains after the bonding; and bonding both parts under predetermined conditions of pressure and temperature.

WO 2015/165967 A1 discloses a system and manufacturing method of a portion of a wind turbine blade. The method uses adhesive spacer elements for ensuring a minimum bond line height between wind turbine blade components. The adhesive spacer elements are positioned between the blade components prior to bonding, and act to define a buffer or space between the bonding surfaces of the respective blade components.

EP 2 468 470 A1 discloses a mould for non-metallic wind turbine blade shells that comprises two semi-moulds, upper and lower, hinged with a pivoting system and equipped with stiffening ribs that hold a system of air conduits on it, and which is partitioned transversely in at least two parts that are joined together with some fastening ribs.

WO 2014/048440 A1 discloses a method of applying adhesive to a wind turbine part, defining a vehicle travel path relative to the part and providing a vehicle on the vehicle travel path. The vehicle is configured to apply adhesive along a bond line defined on a bond surface of the part. Supplying adhesive to the vehicle, applying adhesive along the bond line by causing the vehicle to travel along the vehicle travel path, and varying the speed of the vehicle along the vehicle travel path to control the quantity of adhesive applied at successive positions along the bond line.

SUMMARY OF THE INVENTION

Accordingly, there is a need for systems and methods that will improve glue joint strength of a wind turbine blade. Further, it is an object of the invention to provide a system and method for the joining of blade shell parts which addresses the above problems, in particular providing reduced weight and adhesive use for a wind turbine blade, while improving the performance of bonding areas/glue joints in wind turbine blades.

A method of manufacturing a wind turbine blade is provided, wherein the wind turbine blade is manufactured as a composite structure comprising a reinforcement material embedded in a polymer matrix, the method comprising: providing a first blade mould with a first blade shell part having a leading edge, a trailing edge, and a first leading edge glue surface at the leading edge, the first blade mould comprising a first leading edge flange; and providing a second blade mould with a second blade shell part having a leading edge, a trailing edge, and a second leading edge glue surface at the leading edge, the second blade mould comprising a second leading edge flange. The method comprises applying glue to one or more glue surfaces optionally including a leading edge glue surface, such as the first leading edge glue surface and/or the second leading edge glue surface; providing one or more spacer elements, e.g. one or more leading edge spacer elements at a leading edge flange; arranging the second blade mould on the first blade mould, e.g. such that the one or more leading edge spacer elements are arranged between the first leading edge flange and the second leading edge flange; optionally applying a pressure to a blade shell part, e.g. the first blade shell part and/or the second blade shell part; and curing the glue.

Also provided is a wind turbine blade comprising a first blade shell part and a second blade shell part, wherein each blade shell part is made of a composite structure comprising a reinforcement material embedded in a polymer matrix, each blade shell part extending from a tip end to a root end and having a leading edge and a trailing edge, the wind turbine blade comprising a primary web and one or more primary spacer elements arranged between a blade shell part and the primary web.

The disclosed wind turbine blade and method allows for an optimized use of glue by enabling a more precise control of glue thickness in glue joint(s), such as the leading edge glue joint and/or glue joints between a blade shell part and a web. Thus the amount of glue may be reduced and/or the requirements to glue properties (e.g. strength, thickness working range, curing time, and/or viscosity) may be reduced in turn reducing the material costs and/or weight. Further, optimized glue joints may reduce cycle time. Even more advantageously, the present disclosure enables glue joints with improved mechanical strength due to improved control of the glue thickness.

The method comprises providing a first blade mould with a first blade shell part having a leading edge, a trailing edge, and a first leading edge glue surface at the leading edge, the first blade mould comprising a first leading edge flange. Typically, the first blade shell part in the first blade mould comprises excess first material on the first leading edge flange of the first blade mould. The excess first material is typically removed in the post-processing of the wind turbine blade.

The method comprises providing a second blade mould with a second blade shell part having a leading edge, a trailing edge, and a second leading edge glue surface at the leading edge, the second blade mould comprising a second leading edge flange. Typically, the second blade shell part in the second blade mould comprises excess second material on the second leading edge flange of the second blade mould. The excess second material is typically removed in the post-processing of the wind turbine blade.

The method comprises applying glue to one or more glue surfaces, such as a leading edge glue surface of the first blade shell part and/or the second blade shell part. Applying glue to glue surface(s) may be prior to arranging the second blade mould on the first blade mould.

The method comprises providing one or more leading edge spacer elements at a leading edge flange, such as the first leading edge flange of the first blade mould and/or the second leading edge flange of the second blade mould. A leading edge spacer element may have a thickness in the range from 1 mm to 10 mm, such as about 3 mm. A leading edge spacer element may be compressible, e.g. having a first thickness in a first state (free or uncompressed) and a second thickness in a second state (compressed). The first thickness may range from 5 mm to 5 cm. The second thickness may be in the range from 1 to 10 mm. Providing one or more leading edge spacer elements at a leading edge flange may comprise arranging a leading edge sealing member at the first leading edge flange and/or at the second leading edge flange, e.g. in order to seal the first blade mould and second blade mould at the leading edge. Thus, a spacer element may be or comprise a sealing member. A compressible spacer element enables sealing of blade moulds with varying leading edges. Leading edge spacer element(s) may be configured to provide a controlled distance between the first and second leading edge glue surfaces to be glued together. In one or more methods/wind turbine blades, leading edge spacer element(s) are configured to provide a controlled distance in the range from 1 mm to 10 mm between the first and second leading edge glue surfaces to be glued together.

The method comprises arranging the second blade mould on the first blade mould, e.g. by lowering the second blade mould onto the first blade mould. The second blade mould may be arranged on the first blade mould such that the one or more leading edge spacer elements are arranged between the first leading edge flange and the second leading edge flange.

Further, the method comprises applying a pressure to the second blade shell part thereby ensuring that the glue surfaces of respective wind turbine blade parts (blade shell parts and webs) are forced towards each other, while the spacer element(s) ensures that the glue surfaces do not come too close leaving too little space for the glue.

Subsequently, the glue is cured, and the pressure to the second blade shell part is optionally released, e.g. after curing the glue.

The method may comprise aligning leading edges of the first blade shell part and the second blade shell part prior to applying a pressure to the second blade shell part, such as during or comprised in the act of arranging the second blade mould on the first blade mould. Manufacture of large wind turbine blades with complex shapes in blade moulds presents a challenge when assembling the blade shell parts due to the variances in the blade moulds. By aligning the leading edges, e.g. in contrast to employing a "reduce total error"-principle, a wind turbine blade with improved aerodynamic properties is enabled.

The method may comprise arranging a primary web on the first blade shell part. Arranging a primary web on the first blade shell part may comprise arranging one or more first primary spacer elements between a first glue surface of the primary web and a primary glue surface of the first blade shell part. Arranging a primary web on the first blade shell part may comprise applying glue between the first glue surface of the primary web and the primary glue surface of the first blade shell part, e.g. before, during and/or after arranging first primary spacer element(s).

The first primary spacer element(s) may have a thickness in the range from 1 to 10 mm. A first primary spacer element may be compressible, e.g. having a first thickness in a first state (free or uncompressed) and a second thickness in a second state (compressed). The first thickness may range from 5 mm to 5 cm. The second thickness may be in the range from 1 to 10 mm.

The method may comprise arranging one or more second primary spacer elements between a second glue surface of the primary web and a primary glue surface of the second blade shell part. The method may comprise applying glue between the second glue surface of the primary web and the primary glue surface of the second blade shell part, e.g. before, during and/or after arranging second primary spacer element(s).

The second primary spacer element(s) may have a thickness in the range from 1 to 10 mm, such as about 3 mm. A second primary spacer element may be compressible, e.g. having a first thickness in a first state (free or uncompressed) and a second thickness in a second state (compressed). The first thickness may range from 5 mm to 5 cm. The second thickness may be in the range from 1 to 10 mm.

Use of spacer elements between blade shell parts and web(s) allows for an optimized use of glue by enabling a more precise control of glue thickness in glue joints between blade shell part and webs. Thus the amount of glue may be reduced and/or the requirements to glue properties (e.g. strength, thickness working range, curing time, and/or viscosity) may be reduced in turn reducing the material costs and/or weight. Further, an optimized blade shell part/web glue joint may reduce cycle time. Even more advantageously, the present disclosure enables a blade shell part/ web glue joint with improved mechanical strength due to improved control of the glue thickness.

The method may comprise providing one or more trailing edge spacer elements at a first trailing edge flange of the first blade mould or a second trailing edge flange of the second blade mould. A trailing edge spacer element may have a thickness in the range from 1 mm to 10 mm. A trailing edge spacer element may be compressible, e.g. having a first thickness in a first state (free or uncompressed) and a second thickness in a second state (compressed). The first thickness may range from 5 mm to 5 cm. The second thickness may be in the range from 1 to 10 cm. Providing one or more trailing edge spacer elements at a trailing edge flange may comprise arranging a trailing edge sealing member at the first trailing edge flange and/or at the second trailing edge flange, e.g. in order to seal the first blade mould and second blade mould at the trailing edge. Thus, a spacer element may be or comprise a sealing member. A compressible spacer element enables sealing of blade moulds with varying leading edges. The method may comprise arranging the second blade mould on the first blade mould, such that the one or more trailing edge spacer elements are arranged between the first trailing edge flange and the second trailing edge flange.

Spacer elements, such as leading edge spacer element(s), primary spacer element(s) and/or trailing edge spacer element(s), combined with pressure on the second blade shell part provides well-defined glue joints of the wind turbine blade, enabling control of the glue joint thickness.

Spacer element(s) may be configured to provide controlled distances between the glue surfaces to be glued together, such as the first leading edge glue surface and the second leading edge glue surface.

In the method, applying a pressure to the second blade shell part may comprise applying a negative pressure to an inside of the wind turbine blade. In the present context, the term "negative pressure" refers to a situation in which an enclosed volume, e.g. inside of a wind turbine blade, has lower pressure than its surroundings. For example, a pump device may apply a negative pressure to the inside of the wind turbine blade, e.g. to obtain a pressure difference between the inside and the outside of the wind turbine blade. The pressure difference may be in the range from 50 mbar to 500 mbar. In one or more exemplary methods, the pressure is a negative pressure with a pressure difference between the inside of the wind turbine blade and the outside of the wind turbine blade in the range from 100 mbar to 200 mbar.

Applying a pressure to the second blade shell part may comprise applying a positive pressure to an outer surface of second blade shell part. For example, a pump device may apply a positive pressure to the outside (second blade shell part) of the wind turbine blade, e.g. to obtain a pressure difference between the inside and the outside of the wind turbine blade. The pressure difference may be in the range from 50 mbar to 500 mbar. In one or more exemplary methods, the pressure is a positive pressure with a pressure difference between the inside of the wind turbine blade and the outside of the wind turbine blade in the range from 100 mbar to 200 mbar.

In one or more exemplary methods, the second blade shell part may be forced by means of mechanical actuators in contact with the second blade shell part. Thus, applying a pressure to the second blade shell part may comprise contacting the outer surface with an actuator and pressing the second blade shell part towards the first blade shell part. Further, applying a pressure to the second blade shell part may comprise anchoring an actuator to the inside of the second blade shell part and dragging the second blade shell part towards the first blade shell part.

The wind turbine blade comprises first blade shell part and a second blade shell part, wherein each blade shell part is made of a composite structure comprising a reinforcement material embedded in a polymer matrix, each blade shell part extending from a tip end to a root end and having a leading edge and a trailing edge. The first blade shell part and the second blade shell part may each comprise one or more spar caps such as a primary spar cap and optionally a secondary spar cap.

The wind turbine blade comprises one or more webs including a primary web. The primary web may be arranged between primary spar caps of the first blade shell part and the second blade shell part. The wind turbine blade comprises one or more primary spacer elements arranged between a blade shell part and the primary web. In one more exemplary wind turbine blades, the one or more primary spacer elements comprises one or more first primary spacer elements arranged between a first glue surface of the primary web and a primary glue surface of the first blade shell part. The primary glue surface of the first blade shell part may be on the primary (main) spar cap of the first blade shell part.

In one more exemplary wind turbine blades, the one or more primary spacer elements comprises one or more second primary spacer elements arranged between a second glue surface of the primary web and a primary glue surface of the second blade shell part. The primary glue surface of the second blade shell part may be on the primary (main) spar cap of the second blade shell part.

A primary spacer element, such as first primary spacer element(s) and/or second primary spacer element(s), may have a thickness in the range from 1 to 10 mm.

The wind turbine blade may comprise a secondary web and one or more secondary spacer elements arranged between a blade shell part and the secondary web. The secondary web may be arranged between primary spar caps of the first blade shell part and the second blade shell part, e.g. to form a box-shaped load-carrying structure with the primary web and the primary spar caps. In one or more exemplary wind turbine blades, the secondary web may be arranged between secondary spar caps of the first blade shell part and the second blade shell part, e.g. to form two I-shaped load-carrying structures in the wind turbine blade.

A blade shell part/wind turbine blade extends from a root end to a tip end and comprising a root region, a transition region, and an airfoil region. The transition region of the blade shell part/wind turbine blade comprises a shoulder defining a maximum chord of the blade shell part/wind turbine blade.

The present disclosure advantageously relates to blade shell parts, wind turbine blades and manufacture of wind turbine blades, e.g. having a blade length of at least 40 metres, or at least 45 metres, or even at least 50 metres. The blade shell parts may be prebent so that, when assembled to a wind turbine blade and mounted on an upwind configured horizontal wind turbine in a non-loaded state, they will curve forward out of the rotor plane so that the tip to tower clearance is increased. A blade shell part has a tip end and a root end with an inner surface and an outer surface. The inner surface of a blade shell part is a surface that is not exposed to the surroundings when the blade shell part is assembled to a wind turbine blade. The outer surface of a blade shell part is a surface that is exposed to the surroundings when the blade shell part is assembled to a wind turbine blade.

DETAILED DESCRIPTION

Figure 2:
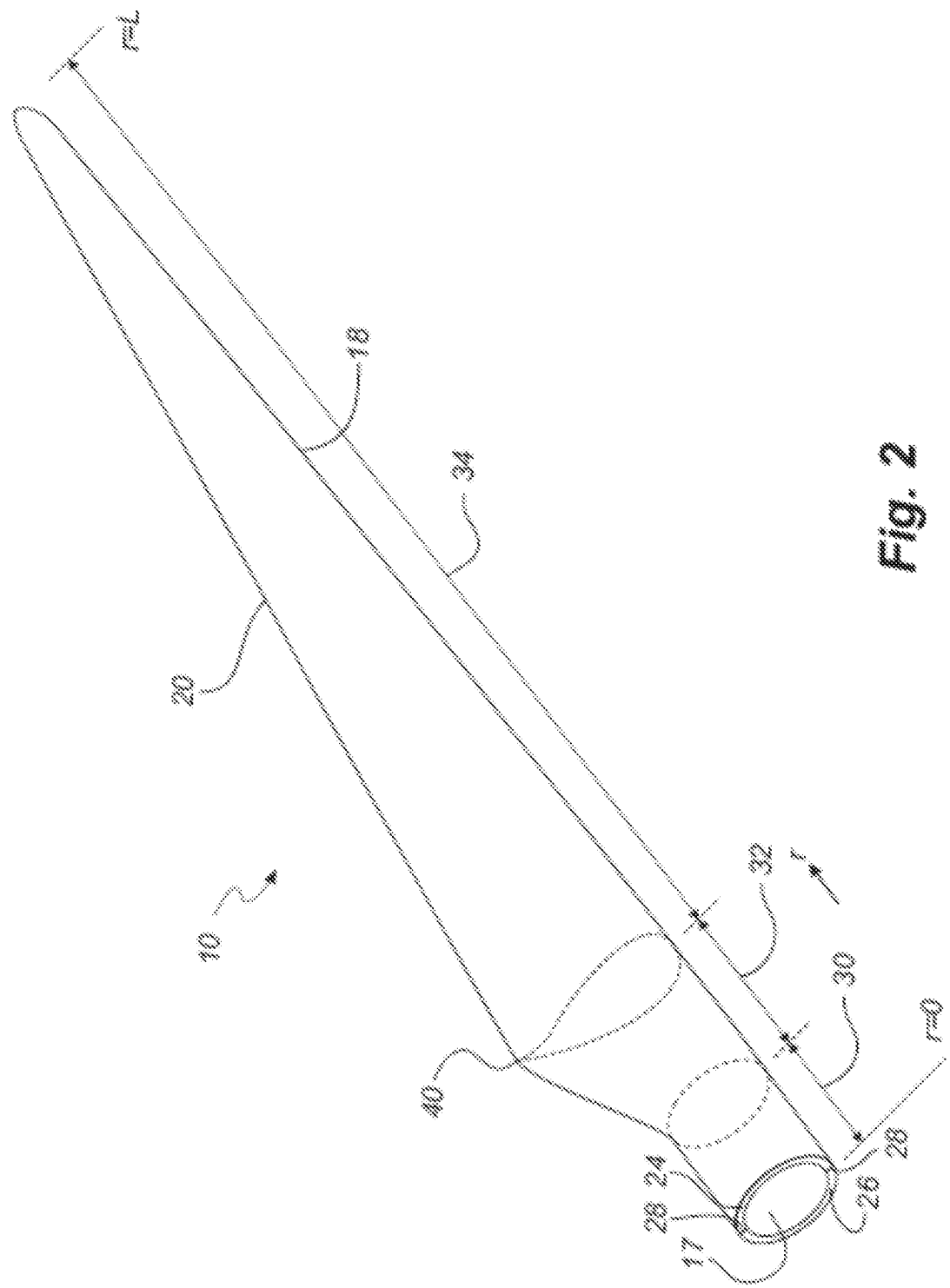
Figure 3:
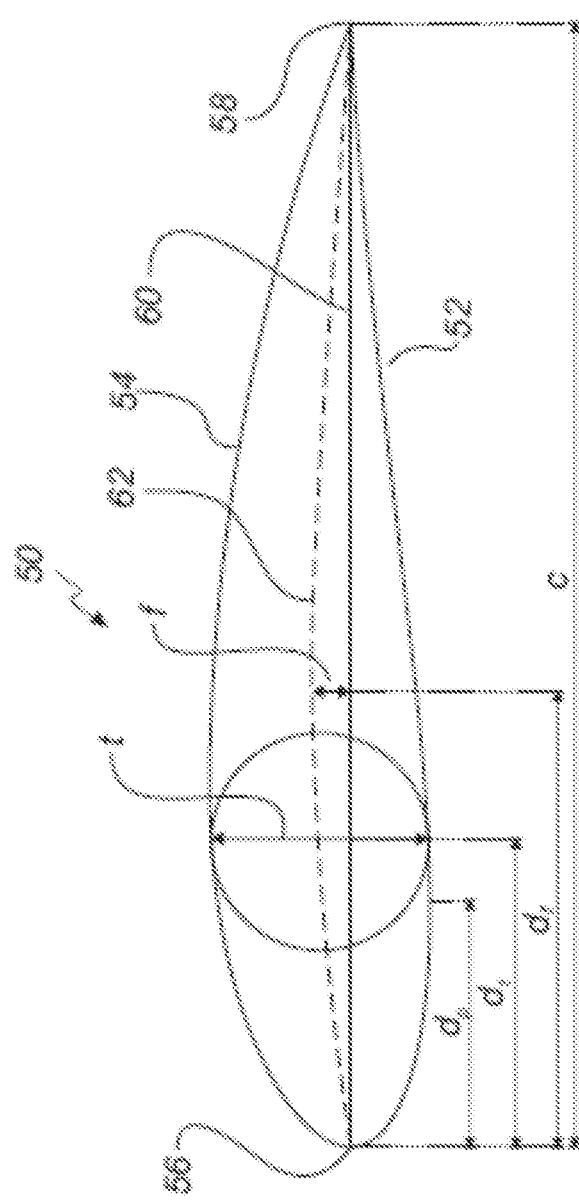
Figure 4:
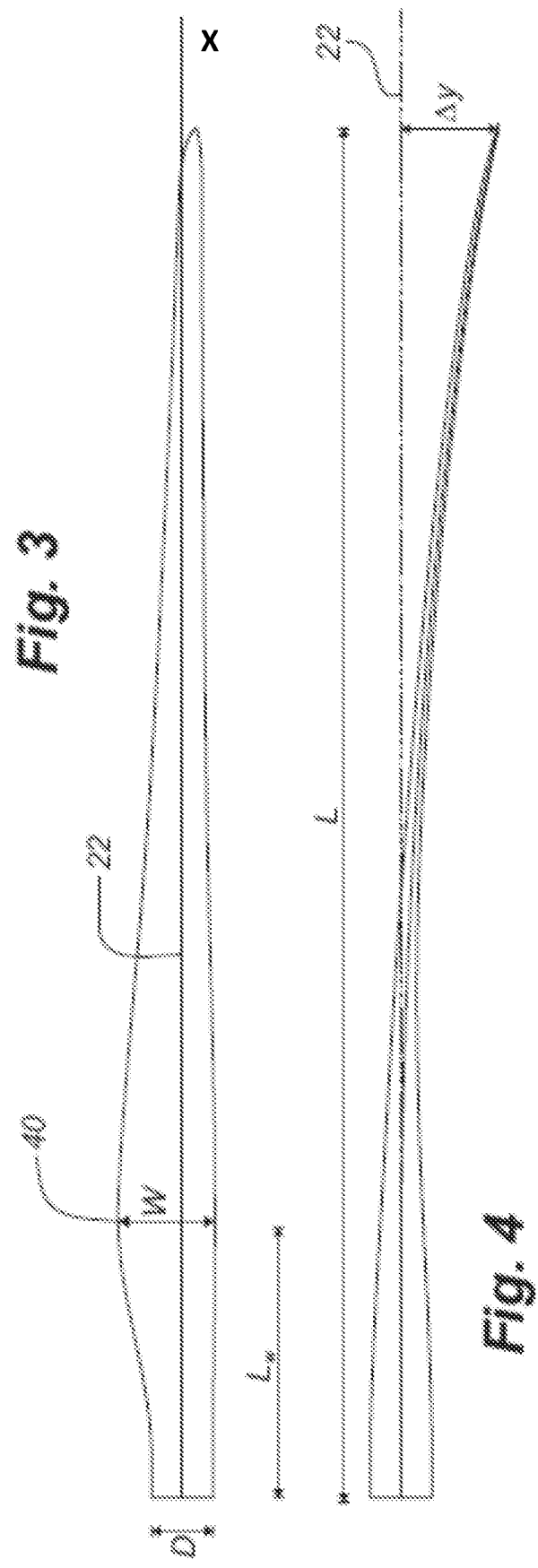

The invention is explained in detail below with reference to the drawings, in which FIG. 1 shows a wind turbine,
FIG. 2 shows a schematic view of a wind turbine blade,
FIG. 3 shows a schematic view of an airfoil profile,
FIG. 4 shows a schematic view of a wind turbine blade, seen from above and from the side,
FIG. 5 partly illustrates manufacture of a wind turbine blade according to the invention,
FIG. 6 partly illustrates manufacture of a wind turbine blade according to the invention, and
FIG. 7 partly illustrates manufacture of a wind turbine blade according to the invention.

The present invention relates to manufacture of blade shell parts of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell comprising two blade shell parts made of fibre-reinforced polymer and is typically made as a pressure side or upwind blade shell part 24 and a suction side or downwind blade shell part 26 that are glued together along bond lines/glue joints 28 extending along the trailing edge 20 and the leading edge 18 of the blade 10. Typically, the root ends of the blade shell parts 24, 26 has a semi-circular or semi-oval outer cross-sectional shape.

FIGS. 3 and 4 depict parameters, which may be used to explain the geometry of blade shell parts to be manufactured according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade and blade shell parts. The blade and blade shell parts have a total blade length L. As shown in FIG. 3, the root end is located at position r=0, and the tip end located at r=L. The shoulder 40 of the blade shell parts is located at a position r=$L_w$, and has a shoulder width W, which equals the chord length at the shoulder 40. The diameter of the root is defined as X. Further, the blade/blade shell parts are provided with a prebend, which is defined as Δy, which corresponds to the out of plane deflection from a pitch axis 22 of the blade.

Figure 5:
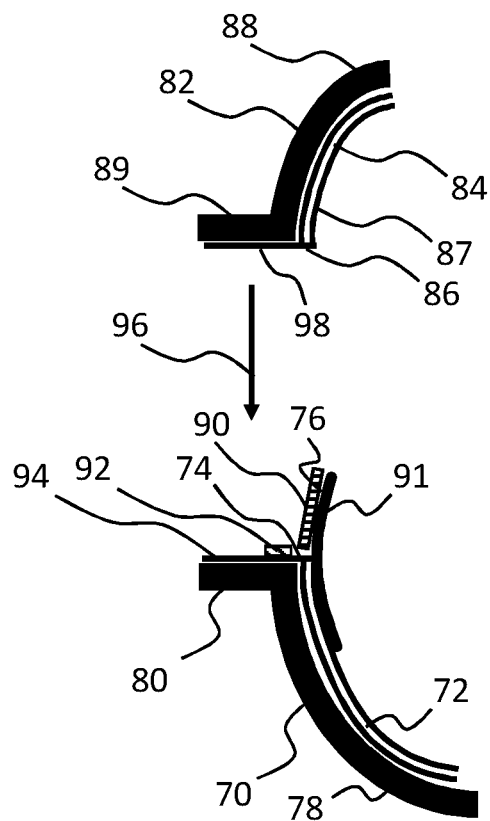

FIG. 5 partly illustrates manufacture of a wind turbine blade according to the invention. FIG. 5 is a cross-section perpendicular to the pitch axis of a part of the blade moulds with blade shell parts. A first blade mould 70 with a first blade shell part 72 is provided. The first blade shell part 72 has a leading edge 74, a trailing edge (not shown), and a first leading edge glue surface 76 at the leading edge 74. The first blade mould comprises a first mould shell 78 and a first leading edge flange 80. Further, a second blade mould 82 with a second blade shell part 84 is provided. The second blade shell part 84 has a leading edge 86, a trailing edge (not shown), and a second leading edge glue surface 87 on the inside of the second blade shell part at the leading edge 86. The second blade mould 82 comprises a second mould shell 88 and a second leading edge flange 89.

Glue 90 is applied to the first leading edge glue surface 76 on glue flange 91, and a leading edge spacer element 92 is provided at the first leading edge flange 80 of the first blade mould 70 on first excess material 94 of the first blade shell part 72. Upon application of glue 90 and provision of leading edge spacer element 92, the second blade mould 82 is arranged on the first blade mould 70 by lowering the second blade mould 82 with the second blade shell part 84 onto the first blade mould 70 in the direction indicated by arrow 96, such that the leading edge spacer element 92 is arranged between the first leading edge flange 80 and the second leading edge flange 89.

Figure 6:
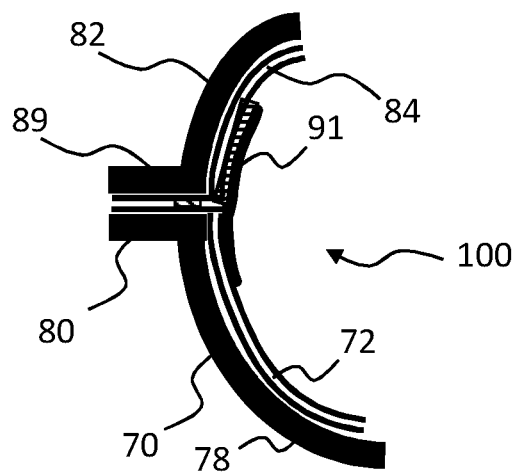

FIG. 6 partly illustrates manufacture of a wind turbine blade according to the invention. The first blade mould 70 has been arranged on the second blade mould 82 by aligning the leading edge 74 of the first blade shell part 72 and the leading edge 86 of the second blade shell part 84 and lowering the second blade mould 82 on the first blade mould 70. The second blade mould 82 has been arranged on the first blade mould 70, such that the leading edge spacer element 92 is arranged between the first leading edge flange 80 and the second leading edge flange 89. The leading edge spacer element 92 is arranged between first excess material 94 of first blade shell part 72 and second excess material 98 of the second blade shell part 84 and is configured to control the distance between the first leading edge glue surface 76 and the second leading edge glue surface 87. After arranging the second blade mould 82 on the first blade mould 70, a pressure is applied to the second blade shell part 84 by applying a negative pressure to an inside 100 of the wind turbine blade. In one or more exemplary methods, a pressure is applied to the second blade shell part 84 by applying a positive pressure to an outer surface of second blade shell part 84, e.g. via one or more pressure valves in the second mould shell 88. A negative or positive pressure is applied, e.g. such that the pressure difference between the outside and the inside of the wind turbine blade is at least 100 mbar. The glue 90 is cured and the pressure to the second blade shell part 84 is released.

Figure 7:
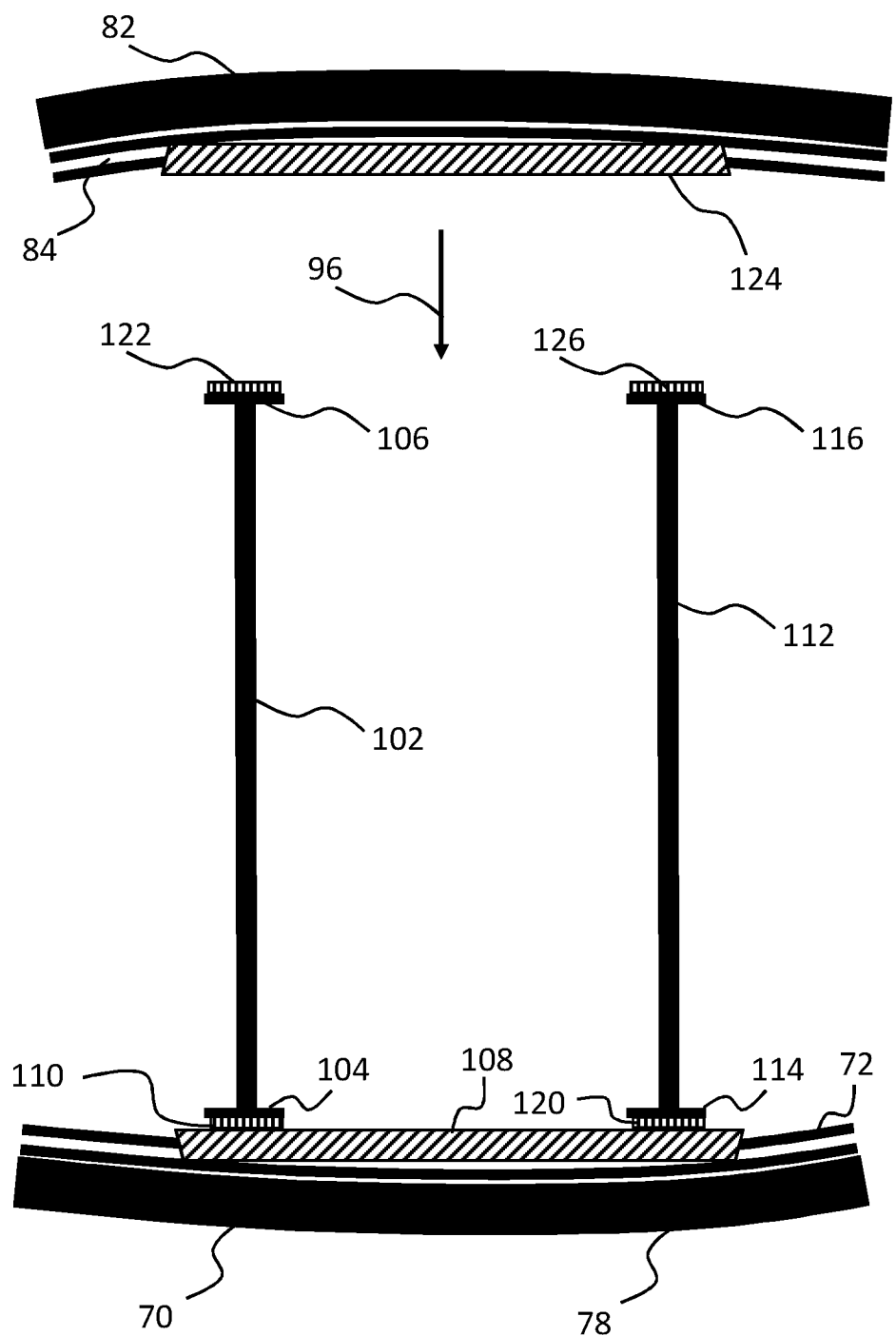

FIG. 7 partly illustrates manufacture of a wind turbine blade according to the invention. FIG. 7 is a cross-section perpendicular to the pitch axis of a part of the blade moulds with blade shell parts. A primary web 102 with respective first and second glue flanges 104, 106 is arranged on the first blade shell part 72 with first primary spacer element and glue, commonly referenced with 110, being arranged between first glue surface of first glue flange 104 of primary web 102 and primary glue surface of a first primary spar cap 108 of the first blade shell part 72.

Further, a secondary web 112 with respective first and second glue flanges 114, 116 may be arranged on the first blade shell part 72 with first secondary spacer element and glue, commonly referenced with 120, being arranged between first glue surface of first glue flange 114 of primary web 112 and secondary glue surface of the first primary spar cap 108.

A second primary spacer element and glue, commonly referenced with 122, is arranged between a second glue surface of the second glue flange 106 of the primary web 102 and a primary glue surface of the second blade shell part (second primary spar cap 124). Thus, glue is arranged between the second glue surface of the primary web and the primary glue surface of the second blade shell part. Glue may be applied to the second glue surface and/or glue may be applied to primary glue surface of the second blade shell prior to arranging the second blade mould on the first blade mould, such that glue is arranged between the second glue surface of the primary web and the primary glue surface of the second blade shell part after arranging the second blade mould on the first blade mould.

A second secondary spacer element and glue, commonly referenced with 126, is arranged between a second glue surface of the second glue flange 116 of the secondary web 112 and a secondary glue surface of the second blade shell part (second primary spar cap 124).

Primary spacer element(s) and/or secondary spacer element(s) may be applied to the second glue surface of respective webs 102, 112 prior to arranging the second blade mould on the first blade mould. Primary spacer element(s) and/or secondary spacer element(s) may be applied to primary/secondary glue surfaces of the second blade shell prior to arranging the second blade mould on the first blade mould, such that glue and spacer elements are arranged between the second glue surfaces of respective webs 102, 112 and primary/secondary glue surfaces of the second blade shell part 84 when the second blade mould 82 has been arranged on the first blade mould 70 as indicated by arrow 96. After arranging the second blade mould on the first blade mould as indicated by arrow 96, pressure is applied and glue is cured as described in relation to FIG. 6

The invention has been described with reference to preferred embodiments. However, the scope of the invention is not limited to the illustrated embodiments, and alterations and modifications can be carried out without deviating from the scope of the invention that is defined by the following claims. The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge 22 pitch axis
24 pressure side blade shell part/upwind blade shell part/first blade shell part
26 suction side blade shell part/downwind blade shell part/second blade shell part
28 bond lines/glue joints
29 horizontal
30 root region
32 transition region
34 airfoil region
50 airfoil profile
52 pressure side/upwind side
54 suction side/downwind side
56 leading edge
58 trailing edge
60 chord
62 camber line/median line
70 first blade mould
72 first blade shell part
74 leading edge
76 first leading edge glue surface
78 first mould shell
80 first leading edge flange
82 second blade mould
84 second blade shell part
86 leading edge
87 second leading edge glue surface
88 second mould shell
89 second leading edge flange
90 glue
91 glue flange
92 leading edge spacer element
94 first excess material
96 direction
98 second excess material
100 inside of wind turbine blade
102 primary web (shear web)
104 first glue flange
106 second glue flange
108 first primary spar cap
110 first primary spacer element and glue
112 secondary web (shear web)
114 first glue flange
116 second glue flange
120 first secondary spacer element and glue
122 second primary spacer element and glue
124 second primary spar cap
126 second secondary spacer element and glue
c chord length
$d_t$ position of maximum thickness
$d_f$ position of maximum camber
$d_p$ position of maximum pressure side camber
f camber
L blade length
r local radius, radial distance from blade root
t thickness
D blade root diameter
Δy prebend
X longitudinal axis

The invention claimed is:

1. A method of manufacturing a wind turbine blade (10), wherein the wind turbine blade is manufactured as a composite structure comprising a reinforcement material embedded in a polymer matrix, the method comprising:
providing a first blade mould (70) with a first blade shell part (72) having a leading edge (74), a trailing edge, and a first leading edge glue surface (76) at the leading edge (74), the first blade mould (70) comprising a first leading edge flange (80);
providing a second blade mould (82) with a second blade shell part (84) having a leading edge (86), a trailing edge, and a second leading edge glue surface (87) at the leading edge (86), the second blade mould (82) comprising a second leading edge flange (89);
applying glue (90) to at least one of the first and second leading edge glue surfaces (76; 87);
providing one or more leading edge spacer elements (92) at least one of the first and second leading edge flanges (80; 89);
arranging the second blade mould (82) on the first blade mould (70), such that the one or more leading edge spacer elements (92) are arranged between the first leading edge flange (80) and the second leading edge flange (89);
applying a pressure to the second blade shell part (84); and
curing the glue (90).

2. The method according to claim 1, wherein the one or more leading edge spacer elements (92) have a thickness in the range from 1 mm to 10 mm.

3. The method according to claim 1, wherein the method comprises aligning the leading edges (74; 86) of the first blade shell part (72) and the second blade shell part (84) prior to applying the pressure to the second blade shell part (84).

4. The method according to claim 1, wherein the method comprises:
arranging a primary web (102) on the first blade shell part (72), wherein arranging a primary web (102) on the first blade shell part (72) comprises arranging one or more first primary spacer elements (110) between a first glue surface of the primary web (102) and a primary glue surface of the first blade shell part (72), and applying glue between the first glue surface of the primary web (102) and the primary glue surface of the first blade shell part (72).

5. The method according to claim 4, wherein the one or more first primary spacer elements (110) have a thickness in the range from 1 to 10 mm.

6. The method according to claim 4, wherein the method comprises:
arranging one or more second primary spacer elements (122) between a second glue surface of the primary web (102) and a primary glue surface of the second blade shell part (84); and
applying glue (122) between the second glue surface of the primary web and the primary glue surface of the second blade shell part (84).

7. The method according to claim 6, wherein the one or more second primary spacer elements (122) have a thickness in the range from 1 to 10 mm.

8. The method according to claim 1, wherein the method comprises:
providing one or more trailing edge spacer elements at a first trailing edge flange of the first blade mould (70) or a second trailing edge flange of the second blade mould (82); and
arranging the second blade mould (82) on the first blade mould (70), such that the one or more trailing edge spacer elements are arranged between the first trailing edge flange and the second trailing edge flange.

9. The method according to claim 1, wherein the step of applying the pressure to the second blade shell part (84) comprises applying a negative pressure to an inside of the wind turbine blade (10).

10. The method according to claim 1, wherein the step of applying the pressure to the second blade shell part (84) comprises applying a positive pressure to an outer surface of second blade shell part (84).

\* \* \* \* \*